UNITED STATES PATENT OFFICE.

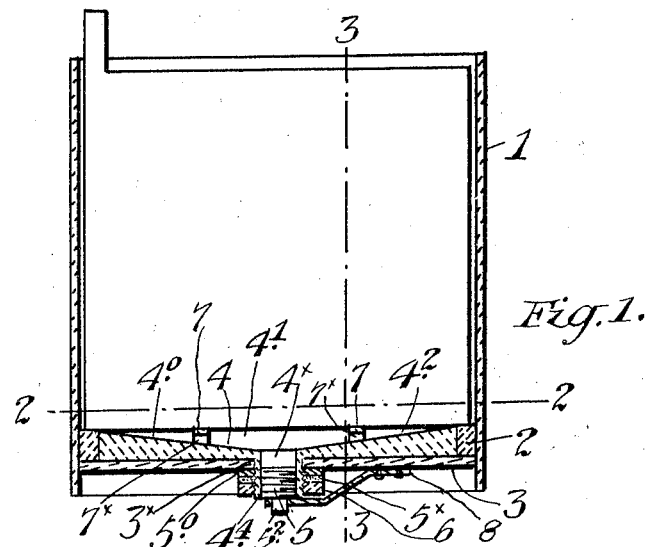

PERCY DOUGLAS IVEY, OF GUELPH, AND ALFRED JAMES SALISBURY, OF TORONTO, ONTARIO, CANADA.

DRAIN DEVICE FOR STORAGE BATTERIES.

1,330,634.  Specification of Letters Patent.  Patented Feb. 10, 1920.

Application filed February 14, 1919. Serial No. 277,098.

*To all whom it may concern:*

Be it known that we, PERCY DOUGLAS IVEY, of the city of Guelph, in the county of Wellington, in the Province of Ontario, Canada, and ALFRED JAMES SALISBURY, of the city of Toronto, in the county of York, in the Province of Ontario, Canada, have invented certain new and useful Improvements in Drain Devices for Storage Batteries, of which the following is the specification.

Our invention relates to improvements in drain devices for storage batteries and the object of the invention is to devise a simple means for periodically draining and flushing out the cell of a battery preliminary to recharging and at the same time forming means whereby the plates of the battery are firmly supported and it consists essentially of the following arrangement and construction of parts as hereinafter more particularly explained.

Figure 1, is a cross sectional view through a battery cell and our drain device.

Fig. 2, is a sectional plan view through Fig. 1 on line 2—2.

Fig. 3 is a vertical sectional view through Fig. 1 on line 3—3.

Fig. 4, is a sectional view showing the means for draining a series of batteries such as used in an automobile and showing a portion of the automobile containing the same in section.

Fig. 5, is a plan view of the device shown in Fig. 4 removed from the automobile.

In the drawings like characters of reference indicate corresponding parts in the various figures.

1 indicates the battery cell. 2 indicates a reinforcing piece which extends around the walls of the battery cell in proximity to the bottom. 3 indicates the bottom wall of the cell provided with a center orifice $3^x$. 4 indicates a supplemental draining bottom having a central orifice $4^x$ into which the bottom converges in an inclined direction as shown at $4^0$, $4'$, $4^2$ and $4^3$ Fig. 2. Around the orifice $4^x$ is a depending annular flange $4^4$ provided with an external thread and an internal thread. 5 indicates a threaded plug which is screwed into the annular flange $4^4$ engaging the internal thread thereof. $5^0$ indicates a lead washer which extends around the annular flange $4^4$ against the bottom 3 of the cell. $5^x$ indicates a rubber washer also extending around the flange $4^4$ and against the lead washer $5^0$. 6 indicates a nut of celluloid, which is screwed onto the external thread of the flange $4^4$ against the rubber washer $5^x$.

It will, of course, be understood that all the parts forming the battery such as we describe are made of celluloid or any suitable acid resisting material.

The bottom 4 in proximity to each side of the center is provided with a cross rib 7 having a bridging orifice $7^x$ formed therein. By means of the bridging orifice $7^x$ any deposits which collect at the bottom of the cell are drained toward the discharge orifice $4^x$, and through the orifice when the plug 5 is removed. The plug 5 is preferably provided with a square head $5^2$ with which a strip of celluloid 8 engages so as to form a key.

When it is desired to drain the battery all that it is necessary to do is to spring the key free, unscrew the plug 5 and allow the contents to drain away. The cell 1 may be also flushed out so as to thoroughly clean the interior thereof before it is recharged and the plug 5 reinserted. The surrounding portion 2 and cross rib portions 7 also form a firm and level support for the battery plates 9.

In order to provide a drain for a plurality of cells such as would be used in an automobile we provide a supplemental drain pan 10 (see Figs. 4 and 5), upon the side walls of which are supported cross bars 11 upon which the cells 1 are carried, such cells being provided with drain orifices such as described in relation to Figs. 1, 2 and 3.

12 indicates a runway carried by the side walls of the automobile housing 13, such runway carrying rollers 14 on which the drain pan rests. The drain pan 10 is provided at each side with swinging legs 15 which also serve to engage the projections 17 extending from the side walls of the housing 13 so as to hold the drain pan in place when in the inserted position.

When it is desired to turn the batteries all that it is necessary to do is to remove the housing covering in the usual manner, release the swinging legs 15 from the projections, allow the pan 10 to ride downwardly into the dotted position shown in Fig. 7 and swing the legs down so that they support the free end of the pan upon the ground.

16 indicates a projection which engages the cross piece 17 so as to prevent the complete withdrawal of the pan. All that it is necessary then to do is to remove the drain plugs of the cells and allow the batteries to drain into the pan 10. When they are drained and flushed out the whole set of batteries may be then slid into position again and reconnected.

What we claim as our invention is—

1. In a drain device for battery cells, the combination with the cell walls and bottom thereof having a central orifice, of a supplemental bottom fitting the bottom of the cell and having a central orifice designed to register with the aforesaid orifices and means for forming a liquid tight connection between both orifices.

2. In a drain device for battery cells, the combination with the cell walls and bottom thereof having a central orifice, of a supplemental bottom fitting the bottom of the cell and having a central orifice designed to register with the aforesaid orifices, means for forming a liquid tight connection between both orifices and a downward extending conduit and a closure for such conduit.

3. In a drain device for battery cells, the combination with the cell walls and bottom thereof, of the supplemental bottom having supporting ribs for the electrode extending up from such bottom and means for draining the space below the level of the ribs of the supplemental bottom.

4. In a drain device for battery cells, the combination with the cell walls and bottom thereof having a central orifice, of a supplemental bottom fitting on to the bottom of the cell and having a central orifice, the upper face of such member inclining downwardly from its outer edge to its inner edge around such orifice.

5. In a drain device for battery cells, the combination with the cell walls and bottom thereof having a central orifice, of a supplemental bottom fitting on to the bottom of the cell and having a central orifice, the upper face of such member declining downwardly from its edges toward such orifice, a depending annular flange extending from around the orifice of the member through the orifice of the bottom of the cell, means for securing the parts together, and a closing plug adapted to be screwed into the annular flange.

6. In a drain device for battery cells, the combination with the cell walls and bottom thereof having a central orifice, of a bottom member fitting on to the bottom of the cell and having a central orifice, the upper face of such member inclining downwardly from its edges toward such orifice, a depending annular flange extending from around the orifice of the member through the orifice of the bottom of the cell, cross ribs extending across the outer face of the drain member adapted to form a support for the cell plates and having a bridging orifice through which the sediment is adapted to pass, means for securing the parts together, and a closing plug adapted to be screwed into the annular flange.

7. In a battery cell, the combination with the side walls and bottom thereof having a center orifice, a rib extending around the bottom of the cell against the side walls, a drain bottom fitting within such rib having a central orifice and having its upper face inclined from its sides toward such orifice, an annular flange extending around the orifice and depending through the central orifice of the cell bottom, and means for securing the parts together, and a closing plug adapted to be screwed into the annular flange.

8. In a battery cell, the combination with the side walls and bottom thereof having a center orifice, a rib extending around the bottom of the cell against the side walls, a drain fitting within each rib having a central orifice and having its upper face inclined from its sides toward such orifice, an annular flange extending around the orifice and depending through the central orifice of the cell bottom, cross ribs extending across the drain device, the upper edges of which are flush with the upper edges of the surrounding ribs and adapted to form a support for the battery plates and having bridging orifices through which the sediment forming the bottom of the wall is adapted to pass, means for securing the parts together, and a closing plug adapted to be screwed into the annular flange.

PERCY DOUGLAS IVEY.
ALFRED JAMES SALISBURY.

Witnesses:
B. BOYD,
M. EGAN.